United States Patent
Zhu et al.

(10) Patent No.: US 9,977,789 B2
(45) Date of Patent: May 22, 2018

(54) HIERARCHICAL GRID FOR SPATIAL QUERYING

(75) Inventors: Jay J. Zhu, Palo Alto, CA (US); Subramanian Venkateswaran, Santa Clara, CA (US); Anuj Trivedi, Santa Clara, CA (US); Rupesh Verma, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1378 days.

(21) Appl. No.: 13/306,820

(22) Filed: Nov. 29, 2011

(65) Prior Publication Data

US 2013/0138682 A1    May 30, 2013

(51) Int. Cl.
  G06F 7/00      (2006.01)
  G06F 17/30   (2006.01)
  G06F 13/14   (2006.01)

(52) U.S. Cl.
  CPC .............................. *G06F 17/30241* (2013.01)

(58) Field of Classification Search
  CPC ......... G06F 17/30241; G06F 17/30333; G06F 17/30327; G06F 17/30259; G06F 17/3087; G06F 17/30554; G06F 17/30277; G06T 15/06; G06Q 30/02; G05D 1/027
  USPC .... 707/706, 743, 797, 793, 723, 769, 999.1, 707/999.102, E17.014, E17.024, E17.11, 707/724; 370/254; 701/455, 461, 532
  See application file for complete search history.

(56) References Cited

U.S. PATENT DOCUMENTS

| | | | | |
|---|---|---|---|---|
| 6,873,943 B2 * | 3/2005 | Popovici | ........... | G06F 17/30241 703/2 |
| 7,904,486 B2 * | 3/2011 | Crabtree | ........... | G06F 17/30327 707/741 |
| 8,136,062 B2 * | 3/2012 | Steinmetz | ............. | G06F 17/505 716/104 |
| 8,219,517 B2 * | 7/2012 | Wei | ........................ | G06F 17/18 345/418 |
| 2009/0281724 A1 * | 11/2009 | Blumenberg | ...... | G01C 21/3614 701/532 |
| 2010/0085893 A1 * | 4/2010 | Kim | ...................... | H04W 40/24 370/254 |

OTHER PUBLICATIONS

Beckmann N. et al., "The R*-tree: An Efficient and Robust Access Method for Points and Rectangles+" 1990 *ACM* (10 pages).

(Continued)

*Primary Examiner* — Heather Herndon
*Assistant Examiner* — Cecile Vo
(74) *Attorney, Agent, or Firm* — Hickman Palermo Becker Bingham LLP (57) ABSTRACT

Techniques are provided for improving performance of spatial queries by defining a grid that divides the domain space into cells, and then using a cell-to-item mapping to determine which items do not have to be individually evaluated against the location criteria of the spatial queries. Based on the cell to which an item belongs, the item may automatically qualify as a match, be automatically disqualified, or require item-specific evaluation. To account for items with size, the query window of a spatial query may be expanded. To limit the degree to which the query window is expanded, a plurality of grids may be established for the domain space, where each grid has differently sized cells, and items are assigned to grids based on the size of the items.

20 Claims, 6 Drawing Sheets

Spatial query of data elements in grid DB (56) References Cited

OTHER PUBLICATIONS

Bentley, J., "Multidimensional Binary Search Trees Used for Associative Searching" 1975 *ACM Student Award* (9 pages).
Eberhardt, H. et al., "Density Trees for Efficient Nonlinear State Estimation," *Proceedings of the 13$^{th}$ International Conference on Information Fusion*, Edinburgh, United Kingdom, Jul. 2010 (8 pages).
Guttman, A., "R-Trees: A Dynamic Index Structure for Spatial Searching " 1984 *ACM* (11 pages).
Samet, H. et al., "Storing a Collection of Polygons Using Quadtrees" *ACM Transactions on Graphics*, Jul. 3, 1985 (41 pages).
Wald, I. et al., On building fast kd-Trees for Ray Tracing, and on doing that in O (N log N) *IEEE Symposium on Interactive Ray Tracing* 2006 (9 pages).

\* cited by examiner

Figure 1. Grids and data elements

Figure 2. Spatial query of data elements in grid DB

Figure 3. Grid DB handles spatial query of data element with size

Figure 4. Hierarchy Grid DB

FIG. 5 - EXTENDED GRID SPACE TO ENCOMPASS -∞ TO +∞

FIG. 6

HIERARCHICAL GRID FOR SPATIAL QUERYING

FIELD OF THE INVENTION

The present invention relates to spatial querying and, more specifically, to processing spatial queries based on grids applied to the domain space that is targeted by the spatial queries.

BACKGROUND

There are a virtually unlimited number of contexts in which it is useful to determine which items reside within a certain area. For example, one may wish to determine which heavenly bodies in the known universe are within a certain distance of a particular black hole, which dwellings in the entire world reside within five miles of a certain school, or which circuit items in a large integrated circuit reside in a certain region of a chip. Queries used to search for items, within a particular domain, that satisfy specified location criteria are referred to herein as "spatial" queries.

Spatial queries may be performed by (a) storing location information for each item in the domain, and (b) comparing the location criteria of the query against the location information of each item. Unfortunately, when search domains contain large numbers of items, comparing the location information of each item in the domain to the location criteria of the spatial query may be impractical. For example, in the domains mentioned above (heavenly bodies in the known universe, dwellings in the world, circuit items in a microprocessor), the number of comparison operations required to compare the location information of every item in the domain to the location criteria of the query may be in the millions, billions, or more.

As a specific example, consider the context of VLSI design automation. In VLSI design automation, there are many design data entities/items such as devices, parasitic resistors, capacitors etc., to be stored and processed. As technology advances, more and more components are packed onto a single chip design. The number of data entities/items to be handled in a design is often in excess of hundreds millions or over a billion.

A design consists of data items, typically represented as physical objects, such as wire segments, vias, components, pins, etc. The locations of these objects are within the chip boundary. These physical objects sometimes can be abstracted as points. However, more often, objects must be represented with geometric size. In latter case, the data items are associated with intervals instead of points.

CAD (Computer Aided Design) tools often need to do several kinds of operations on data items, such as adding, deleting, modifying, and querying. One of the typical queries performed by a CAD tool is a spatial query to find out all items whose physical coordinates are within the query's location criteria (i.e. the "query window").

Over the years, a number of algorithms and data structures have been designed to speed up spatial queries. Such algorithms range from space-driven algorithms to data-driven algorithms, or hybrid space/data-driven algorithms. Space-driven algorithms tend to sub-divide space either into contiguous grids (simple grid indexing) or recursively divide space into a hierarchy of grids like KD-Tree, Quad-Tree, Octree. Space-driven algorithms are typically data agnostic. Thus, an index is made first, and data is added subsequently. In data-driven algorithms, such as R-Tree, or its variations like R*-Tree, the index dynamically changes as data is added or removed.

There are numerous variations on top of these traditional algorithms that aim to achieve better clustering, minimize physical memory, minimize query time or some other real world constraints, such as development effort. Unfortunately, because data in many scenarios is not randomly distributed, the efficacy of existing approaches is highly dependent on the domains to which the approaches are applied. In some unique problem domains, data tends to form a pattern, where a generalized or even a specialized algorithm from another domain, although devised cleverly, may perform miserably.

In terms of implementation, the traditional algorithms and their data structures require extra pointers to organize data for spatial queries. Each interval data item requires 4-8 pointers for 2-D data. These pointers are extra overhead for each data item. On a 64-bit operating system, an extra 32-64 bytes pointer memory will be needed for each item. The ratio of pointer overhead over useful data memory size gets worse when the data memory size of an item is small, which is very common and typical for cases where number of items in database is huge, for example, more than 10 million. The approaches described hereafter can substantially eliminate such memory overhead for database with large number of elements.

Another advantage of the approaches described hereafter is that database/data structure construction time is linear, or $O(n)$ where n is the number of data items, which is much faster than traditional spatial query algorithms whose database construction time is $O(n*\ln n)$.

In theory, the query time of the approaches described hereafter is similar to the query time of traditional spatial query algorithms. In practice, however, when a query window size is significant, query time of the approaches described hereafter run faster than traditional algorithms. The improved query time speed is obtained, at least in part, because data items whose spatial locations are closer are naturally put to adjacent memory addresses in algorithm implementation. Therefore, the approaches described hereafter minimize memory paging, and minimize disk seeking time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Dividing a Domain Space into Cells

Techniques are described herein for improving performance of spatial queries by (a) defining one or more grids that divide the domain space into cells, and (b) using a cell-to-item mapping to determine which items do not have to be individually evaluated against the location criteria of the spatial queries. Specifically, based on the cell to which an item belongs, the item may automatically qualify as a match, be automatically disqualified, or need to be evaluated individually.

Figure 1:
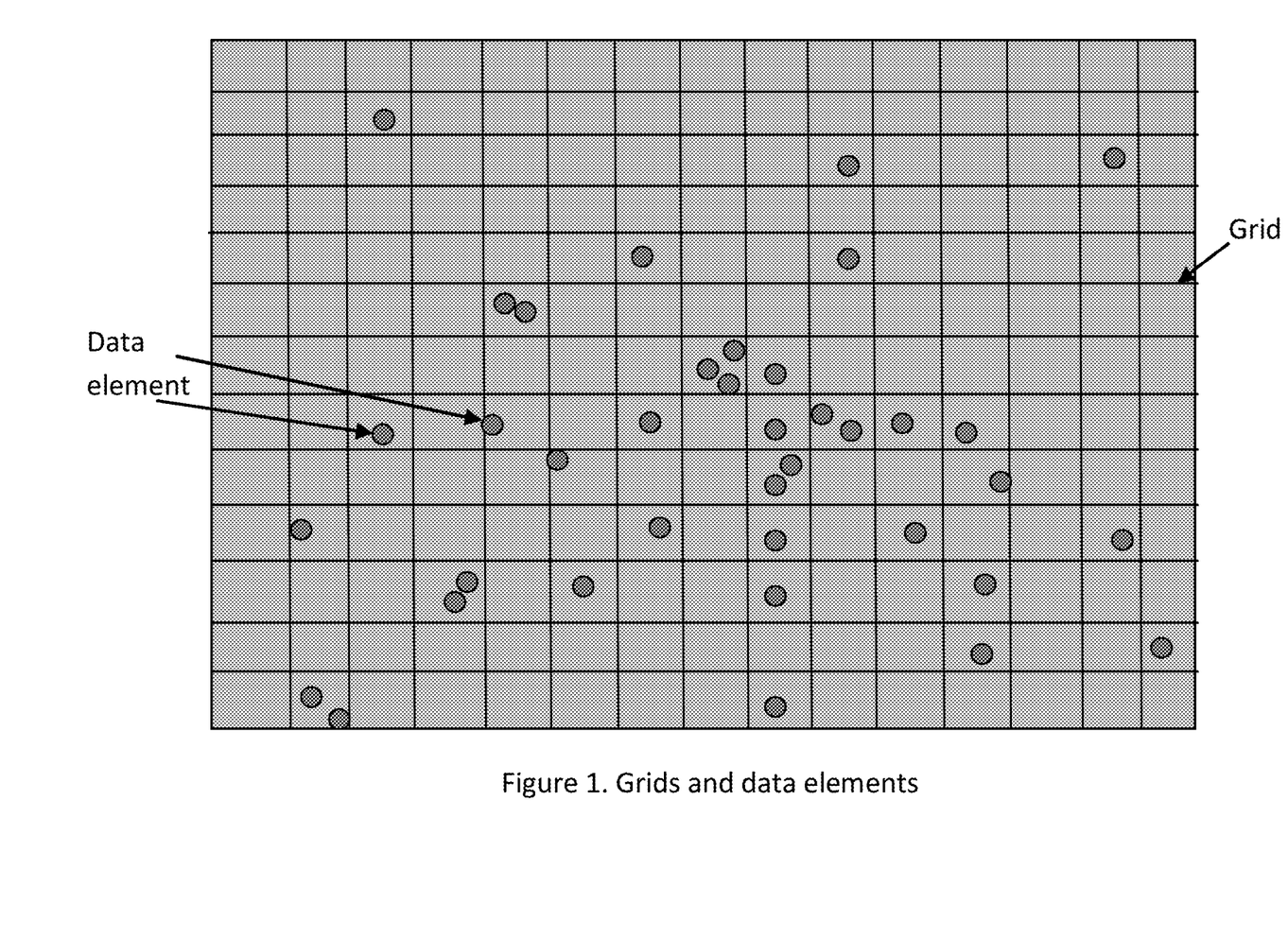
FIG. 1 is a block diagram illustrating how applying grid to the space of a domain may facilitate the execution of spatial queries when item locations are treated as points.

Referring to FIG. 1, it is a block diagram illustrating how a grid may be used to divide a domain space into cells. Within the domain space, data items (e.g. items) are represented as points. As such, each data item resides in exactly one cell. While the grid illustrated in FIG. 1 has square cells, the gridline spacing across one dimension of a domain space need not be the same as the gridline spacing across other spatial dimensions of the domain space. In addition, even within the same spatial dimension, the spacing between gridlines can be uneven.

When the spacing between gridlines across a particular spatial dimension (e.g. the X dimension) is uniform, the mapping between X coordinates and cell indexes in the X dimension can be easily calculated with the following formula:

$$cellIndexX = coordinateX / cellSizeX.$$

$$coordinateOfCellLeftEdgeX = cellIndexX * cellSizeX.$$

The cellIndex and coordinates can be calculated in a similar way for all dimensions.

However, as mentioned above, the size of cells does not have to be even across the entire encompassing searching space. For example, in the case of two dimensions, some column's width can be larger than some other column's width, and some row's height can be larger than the other row's height. In particular, sparser rows and columns (or rows and columns with larger spans) may be defined for areas with less items, and denser rows and columns may be defined for areas with more items. If uneven grids are defined properly, system performance can be improved for cases where item distribution is extremely uneven.

When grid sizes are uneven, various mechanisms may be used to map coordinates to the cell indexes, and to map cell indexes to coordinates. For example, various embodiments may use one or more of a look-up table, a hashing look-up, a binary search, etc. The techniques described herein are not limited to any particular mechanism for mapping cell indexes to coordinates in dimensions that do not have uniform gridline spacing.

In one embodiment, grids are defined based on the following guidelines: (a) the average number of items in each cell>total number of cells, and (b) the number of cells in a large query window>5 in each dimension. The former guideline sets an upper limit on the number of cells in any domain space, and the latter guideline sets a lower limit on the number of cells in the domain space.

Spatial Queries for Point-Represented Items

In some situations, it may be sufficient to represent the location of each item that belongs to a domain with a single point. As a point, each item will have a single attribute value per dimension. Thus, the location information for an item may be (x) in 1-dimension case; (x, y) in 2-dimension case; (x, y, z) in 3-dimension case, etc. Because the location of each item is considered to be a single point, each item will reside in exactly one cell.

Once the domain space has been divided into cells and a cell-to-item mapping has been established, point-represented items that fall within the query window of a spatial query (the "matching set") may be determined by:

Identifying the cells whose boundaries fall entirely within the query window (fully-covered cells)

Adding all items that reside in the fully-covered cells to the matching set

Identifying the cells whose boundaries partially fall within the query window (partially-covered cells)

Determining which items, within the partially-covered cells, fall within the query window by comparing the location information of the items in the partially-covered cells to the location criteria of the query Adding to the matching set all items, within the partially-covered cells, whose location information satisfies the location criteria of the query Identifying the matching set of items for a spatial query in this manner may be significantly faster than comparing the location information of every item to the location criteria of the spatial query. Specifically, using this technique, the only items whose location information is compared against the location criteria are those items that reside in partially-covered cells. Because the partially-covered cells may be a very small fraction of the total domain space, the number of comparisons required by this technique may be significantly less than the total number of items in the domain.

Figure 2:
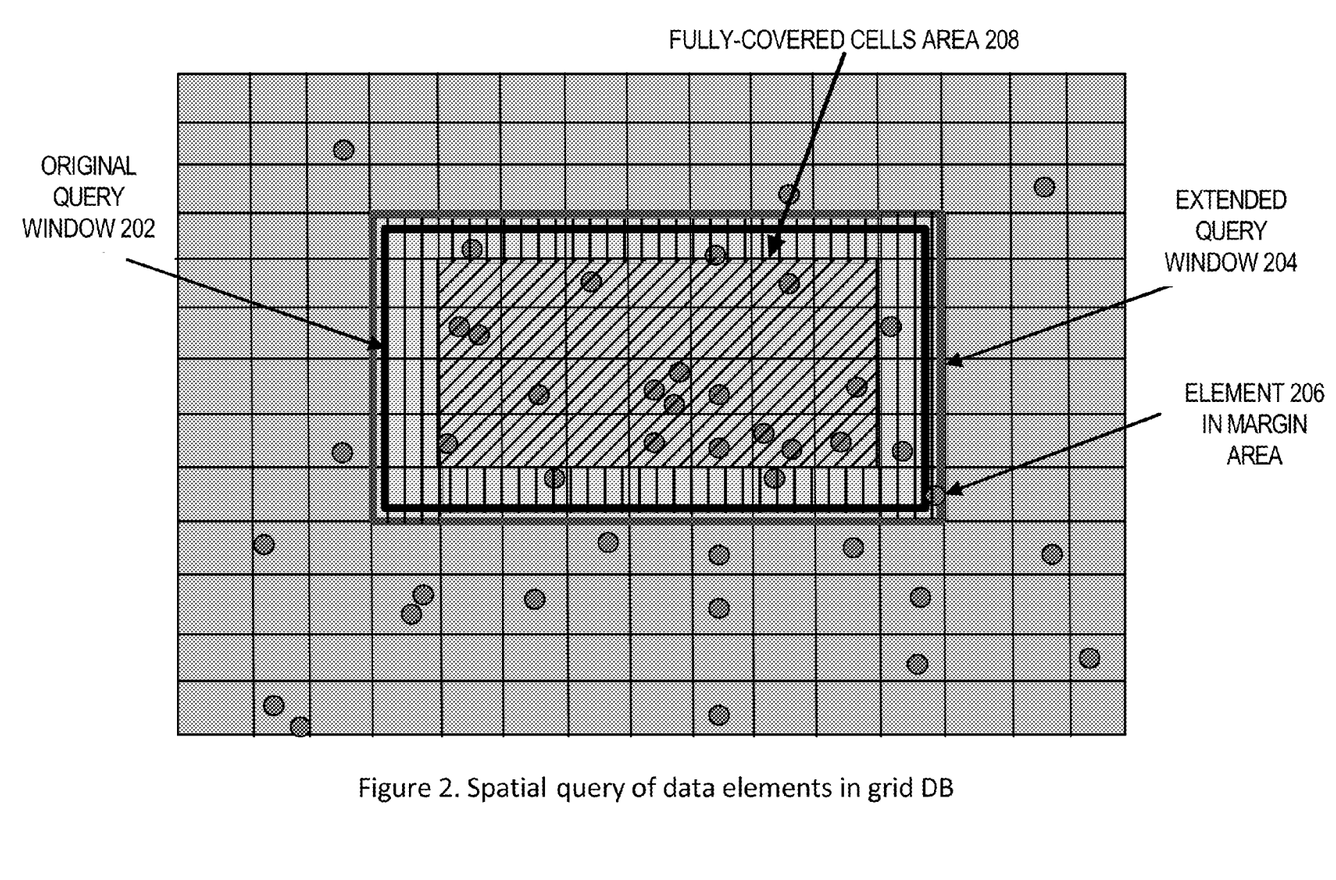
FIG. 2 is a block diagram illustrating how an original query window may be extended to enclose partially-covered cells, according to an embodiment of the invention.

Referring to FIG. 2, it is a block diagram illustrating how using a grid to divide a domain space into cells may be used to facilitate execution of a spatial query. In FIG. 2, the portion of the domain space that is specified by the location criteria of the query is indicated by query window 202. Cells that are encompassed entirely within the query window 202 are indicated by diagonal hash marks (area 208). Cells that are partially encompassed within the query window 202 are indicated by vertical hash marks. As is illustrated in FIG. 2, within the partially-covered cells, some items are within the query window 202 of the original query window, and at least one item 206 is not.

According to one embodiment, in situations such as that illustrated in FIG. 2 where the boundaries of the original query window do not align with gridlines, the original query window is extended outward until the boundaries of the query window align with gridlines. Specifically, each query window boundary is "snapped" outward to the next gridline. Because the adjustment is "outward", the left boundary of query window 202 is adjusted left, the top boundary of query window 202 is adjusted upward, the right boundary of query window 202 is adjusted right, and the bottom boundary of query window 202 is adjusted downward. These adjustments produce an extended query window 204 whose boundaries coincide with gridlines.

By extending the query window in this manner, the extended query window 204 is guaranteed to encompass all fully-covered cells within area 208 and all partially-covered cells, and to exclude all other cells. The cells that are encompassed by the extended query window 204 are then segregated into fully-covered cells and partially-covered cells, by comparing the boundaries of the cells to the original query window 202. All items in the fully-covered cells are automatically added to the matching set, and the items in the partially-covered cells are individually evaluated against the location criteria of the spatial query. Those items, within the partially-covered cells, that satisfy the location criteria are also added to the matching set.

Items with Size

Unfortunately, in many situations, items cannot accurately be represented as single points in space. An item whose spatial location cannot be accurately represented as a single point is referred to herein as an item "with size". For an item with size, the spatial attribute of the item is not a single point, but an interval in some or all dimensions. For example, the spatial attribute of an item can be an interval [minX, maxX] in 1-D, or a rectangle area (minX, minY, maxX, maxY) in 2-D, or a cube area (minX, minY, minZ, maxX, maxY, maxZ). There is a similar way to define super space for >3-D cases.

As a special case, an interval attribute in one dimension can mix with a point attribute in another dimension. For example, it is very common in VLSI design automation for items to have interval attributes in the X and Y dimensions, but a point attribute in the Z dimension (layer).

When items with size are involved, the spatial query execution technique described above does not necessarily yield accurate results, because an item with size may not be always be contained by a single cell in a gridded space. In other words, the relationship between items and cells is no longer 1-to-1. One item may span multiple cells.

Assigning Items with Size to Home Cells

According to one embodiment, the spatial query processing technique described above may be modified to account for items with size by (a) assigning a "home cell" to each item, and (b) extending the original query window in a manner that ensures that the home cells of all items that could possibly satisfy the location criteria of the query fall within the extended query window.

Assigning a home cell to an item may be accomplished by selecting a particular reference point within the item, and treating the cell into which that reference point falls as the home of the item. For the purpose of explanation, it shall be assumed that items are rectangular in shape, and that the bottom left corner of an item is the reference point of the item. Thus, the home cell of each item is the cell in which the lower left corner of the item resides, even though the item itself may span many cells.

While the bottom left corner of an item is used as the reference point in the present examples, the techniques described herein are not limited to the use of any particular rule for establishing reference points. Thus, reference points may be any corner of an item, the center of an item, etc. In addition to determining the home cells to which items are assigned, the rule that establishes the location of reference points within items determines which boundaries of an extended query window need to be further extended to account for the size of items, as shall be described in greater detail hereafter.

Extending Query Windows to Account for Items with Size

The degree to which the original query window has to be extended in any dimension to account for items with size is based on the maximum number of gridlines that can be crossed by any item in that dimension. For any given dimension, the maximum number of gridlines that can be crossed by a single item is referred to herein as the maximum-gridlines-crossed (or "MGC") of the dimension. For grids that have the same MGC for every dimension, the MGC may be treated as the MGC of the grid.

According to one embodiment, in cases where the MGC of a dimension is N, the original query window is extended (N+1) gridlines in that dimension. In the case of point-represented items where each item belongs to a single cell, items cannot cross any gridlines (i.e. MGC=0). Therefore, the original query window is extended (0+1) gridlines (i.e. to the next immediate gridline, as shown in FIG. 2).

On the other hand, in situations where the maximum size of an item is large enough to cross 1 gridline (i.e. span two cells), the MGC for the dimension is 1. When the MGC for a dimension is 1, the original query window is extended in that dimension to the $2^{nd}$ gridline beyond the border of the original query window. In a similar manner, where MGC for a dimension is 4, the original query window is extended in that dimension to the $5^{th}$ gridline beyond the original query window.

Significantly, not all boundaries of the original query windows need to be extended to account for the size of items. Rather, the boundaries of the original query windows that are extended to account for the size of items are determined based on what part of the items are being used as the reference points to assign home cells. For example, if bottom-left corners are selected as the reference points, then only the left and bottom boundaries of the query windows need to be extended to account for the size of items. On the other hand, if the top-right corners are used as the reference points, then only the top and right boundaries of the query windows need to be extended to account for the size of items. In the case that centers are used for the reference points, than all boundaries need be extended (but to a lesser extent than when a corner is used).

Figure 3:
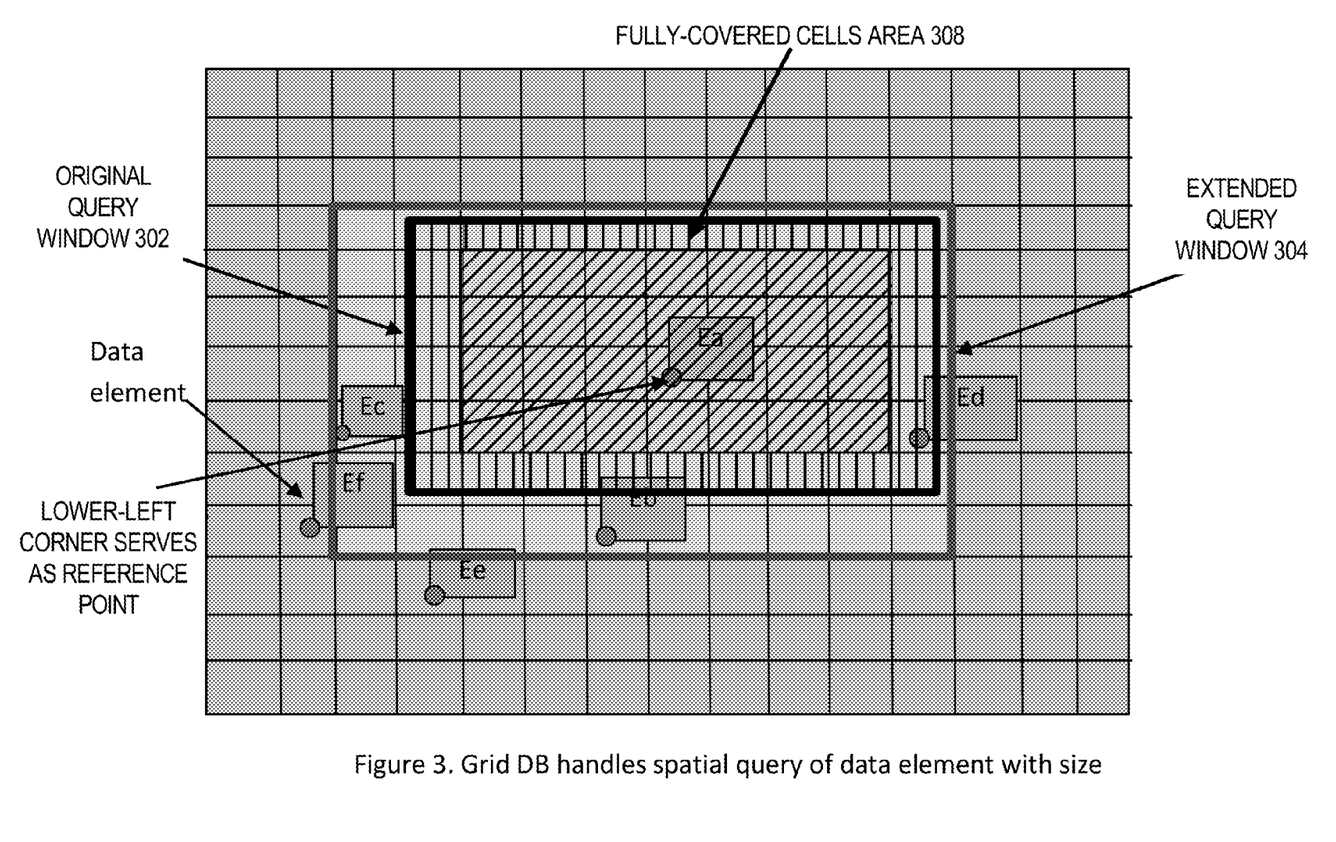
FIG. 3 is a block diagram illustrating how the extended query window may be further extended to compensate for items with size, according to an embodiment of the invention.

FIG. 3 illustrates a situation in which the lower left corner of items are used as the reference points of the items, and no item crosses more than one gridline in any given dimension (i.e. MGC=1 for all dimensions). Consequently, the original query window 302 in FIG. 3 is extended to leftward and downward one more gridline further than the extended window 204 in FIG. 2.

Spatial Queries for Items with Size

Once items have been assigned to home cells based on their reference points, and the original query window has been extended to compensate for the size of items, a spatial query may be executed using steps similar to those used for point-represented items. Specifically, the cells that are encompassed by the extended query window 304 are divided into partially-covered cells and fully-covered cells. Items whose home cells are fully covered, like those in area 308, are automatically added to the matching set. Items whose home cells are partially covered are evaluated individually against the location criteria of the spatial query. Items whose home cells are outside the extended query window 304 are automatically disqualified, because they cannot possibly satisfy the location criteria of the query. Based on the individual evaluations of the items from the partially-covered cells, items that satisfy the location criteria are added to the matching set, while items that do not satisfy the location criteria are disqualified.

Referring to FIG. 3, the upper and right boundaries of original query window 302 are extended to the next immediate gridline, while the left and lower boundaries of the original query window 304 are extended one additional gridline (two total) to account for the size of the items (MGC=1). The cells within the extended query window 304 are separated into fully-covered cells (shown with diagonal hash marks within area 308), and partially-covered cells (shown with vertical hash marks). Item Ea is automatically added to the matching set because the home cell of item Ea is a fully-covered cell. Items Eb, Ec and Ed are evaluated individually against the location criteria because the home cells of items Eb, Ec and Ed are partially-covered cells. Based on the individual evaluations, items Ed and Eb are added to the matching set, while item Ec is disqualified.

Hierarchy of Grids

As the MGC increases, the size of the extended query window increases. As the size of the extended query window increases, the number of partially-covered cells that fall within the extended query window increases. As the number of partially-covered cells increases, the number of items that have to be individually compared against the location criteria of spatial queries increases. Thus, performance of spatial queries is negatively impacted as MGC increases.

Figure 4:
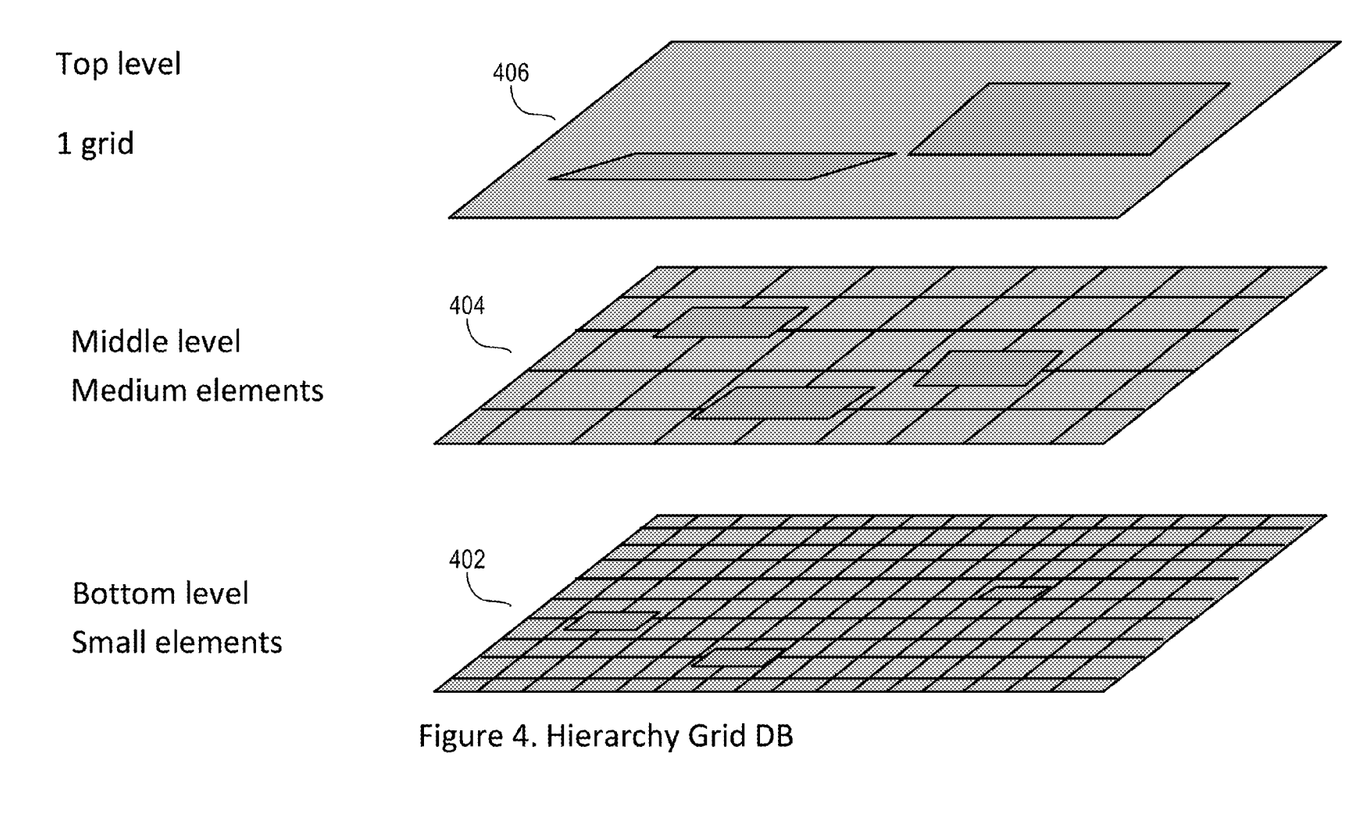
FIG. 4 is a block diagram illustrating how a hierarchy of grids may be used to ensure that, for any given grid, the number of gridlines crossed by any single item does not exceed a predetermined limit.

To ensure that MGC does not exceed a desired threshold, a hierarchy of grids may be established for a domain space, where each grid in the hierarchy has different-sized cells. FIG. 4 illustrates a scenario in which three grids 402, 404 and 406 have been applied to the same domain space. The cells of grids 402, 404 and 406 are increasingly large. Specifically, grid 402 divides the domain space into 160 cells, grid 404 divides the same domain space into 45 cells, while in grid 406, a single cell covers the entire domain space.

For the purposes of explanation, a three-level hierarchy of grids is shown. However, the number of grids in the hierarchy, as well as the size of the cells within the grids, may vary from implementation to implementation. The techniques described herein are not limited to any particular number of levels within a grid hierarchy.

Item-to-Grid Assignment

Once a grid hierarchy has been established for a domain space, items within that domain space may be assigned to grids based on the size of the items, the location of the items, the size of the grid cells, and the maximum allowed MGC for each grid. For example, assume that the MGC for all dimensions of all grids 402, 404 and 406 is 1. Further assume that the cell size of grids 402, 404 and 406 are respectively S1, S2 and S3. Under these conditions, all items where neither dimension crosses two gridlines in grid 402 are assigned to grid 402. All items where at least one dimension crosses two or more gridlines in grid 402, but no dimension crosses two gridlines in grid 404 are assigned to grid 404. All items where at least one dimension crosses two or more gridlines in 404 are assigned to grid 406.

How many gridlines are crossed by an item is determined based both on the size of the item and the location of the item. For example, in a grid of cells whose width is S, an item whose width is 1.5S may cross one gridline or two gridlines. Consequently, some items assigned to grid 402 may have the same size as other items assigned to grid 404. Similarly, some items assigned to grid 404 may have the same size as other items assigned to grid 406.

In the present example, the MGC is the same for all dimensions of all grids in the hierarchy. However, in alternative embodiments, different grids within the hierarchy may have different MGCs. For example, in one embodiment, items within grid 404 may be allowed to cross two gridlines. Under these circumstances, grid 404 would be assigned all items where at least one dimension is crosses two gridlines in grid 402 and no dimension crosses three gridlines in grid 404.

Using a Hierarchy of Grids for Spatial Query Processing

Once items within a domain space have been assigned to the appropriate grids, in the hierarchy of grids that have been defined for a domain space, spatial queries may be executed against the domain space in the manner described above, where each grid is processed as a distinct domain space. Specifically, in the embodiment illustrated in FIG. 4, upon receiving a spatial query, the query window is expanded within grid 402 based on the MGC for the dimensions of grid 402. In the present example, items in grid 402 can cross only one gridline, so the original query window is extended two gridlines to the left of the left boundary of the original query window, and two gridlines below the lower boundary of the original query window. In addition, the upper and right boundaries of the original query window are extended to the immediate next gridlines.

The cells of grid 402 that are within the extended query window are then divided into fully-covered cells and partially-covered cells. Each item in grid 402 whose home is a fully-covered cell is automatically added to the matching set. Each item in grid 402 whose home cell is partially-covered is evaluated against the location criteria, and added to the matching set if the location criteria is satisfied.

Grid 404 is then processed in a similar manner. Specifically, the query window is expanded within grid 404 based on the MGC for the dimensions of grid 404. In the present example, items in grid 404 can cross only one gridline, so the original query window is extended two gridlines to the left of the left boundary of the original query window, and two gridlines below the lower boundary of the original query window. In addition, the upper and right boundaries of the original query window are extended to the immediate next gridlines.

The cells of grid 404 that are within the extended query window are then divided into fully-covered cells and partially-covered cells. Each item in grid 404 whose home is a fully-covered cell is automatically added to the matching set. Each item in grid 404 whose home cell is partially-covered is evaluated against the location criteria, and added to the matching set if the location criteria is satisfied.

Finally, grid 406 is processed. Since grid 406 is a single cell, the cell always qualifies as a partially-covered cell (unless the original query window encompasses the entire domain space). Consequently, each item in grid 406 is evaluated against the location criteria, and added to the matching set if the location criteria is satisfied.

After every level has been processed in this manner, the matching set will include all items, within the domain space, that match the location criteria of the spatial query, regardless of the size of the items or the grid to which the items were assigned.

The Margin Area

As explained above, when executing a spatial query using hierarchical grids, the same process (query window extension and check intersection with the original query window for items in margin gap grids) is applied to all levels of the grid hierarchy. The results from each layer are gathered, and all matching items from all levels are included in the final query results.

Query window extension creates partially-covered cells. The set of all partially-covered cells in a grid is referred to herein as the "margin-area", as shown in FIG. 3 by vertical hash lines. The margin-area causes run-time over-head. The run-time of checking items in margin-area is over-head because the items in this area may or may not belong to the correct result of the query window. The size of margin-area is proportional to the run-time over head, because the larger the margin-area, the more items need to be checked during query execution.

The size of margin-area for a level is proportional to grid size in that level. Therefore, run-time over-head in bottom-level grid of a hierarchy (the grid with the smallest cells) is much less than the run-time over-head in upper-level grids. Therefore, in one embodiment, items are assigned to the lowest level in hierarchy to which they can be assigned without exceeding the target MGC of that level. Specifically, all items that will not exceed the MGC of the bottom-level grid and assigned to the bottom-level grid. Likewise, all items that cannot be placed in the bottom-level grid, and that do not exceed the MGC of the next-level grid, are assigned to the next-level grid, etc.

Configuring the Grid Hierarchy Based on Item Statistics

According to one embodiment, the configuration of the grid hierarchy (number of levels, grid size in each level) is determined based on item statistics to improve performance (minimum disk/memory usage, fastest run time).

In many contexts, when a domain has a large number of items (>>1 million): geometry sizes of the majority (>98%) of items are small, and the number of very large items is few (<2%). For example, in a typical over-million-cell VLSI design, over 98% of cell instances (components) are standard cell with the same unified cell height, and fewer than 2% of cells are macro cells with irregular sizes, which can be >10×10 standard-cell height. In this case, the average grid size of the bottom level of the grid hierarchy may be set to be slightly (10%~20%) larger than standard-cell height and width. Consequently, all standard cells (>98% of total components) will be assigned to bottom level grid in in the hierarchy. Only a few (<2%) large macro cell components will be assigned to upper level grids.

This item distribution will help spatial query speed, because the majority of items are assigned to the bottom level of the hierarchy, and only few items are in the upper level. This data characteristic is quite common, especially if the items do not overlap each other. According to one embodiment, the a grid hierarchy is established based on the following guidelines:

The number of items in the top level should not be too many, such as <10 for small and medium size databases, and <200 for huge databases. If the number of items in the top level is too big and impacts query run time, then a lower level is added to the hierarchy to take away some items in the top level.

The number of levels in the hierarchy should not be too many. A high number of levels will slow down query time, because each level would need to be queried.

For a practical implementation, it has been found that the configuration illustrated in Table 1 below is good for a 2-D grid hierarchy with 10 million-1 billion random items, assuming the space boundary aspect ratio is not too far from 1.

TABLE 1

A recommended configuration for 2-D HGDB with 10,000,000-1,000,000,000 items.

|  | Grid number for items with size | Grid number for point items |
|---|---|---|
| Top level 3 | 1 × 1 | N/A |
| Level 2 | 20 × 20 | N/A |
| Bottom level 1 | 200 × 200 | 200 × 200 |

Memory Usage when Processing Spatial Queries

Memory usage in a database can be categorized into two parts. The first part is generally fixed, such as program code instructions, and base variables. This part of base memory usage is basically a constant, and does not increase with number of data items. The other part of memory usage is associated with data items. In a simple binary tree case, a data item requires two pointers (left child and right child). The memory usage of these two pointers grows proportionally with the number of items.

To accurately measure performance trends of this algorithm with large (>>1 million) number of items, the terminology "memory overhead per item", is used. Memory overhead per item is equivalent to the second part of memory usage, mentioned above. As the number of elements becomes huge, the first part of fixed base memory usage will be too small and can be ignored. But the second part of memory usage, i.e., overhead per item, will proportionally grow as the number of item growing. It is desirable to minimize memory overhead per element, and this effort will make sure that the data structure and the spatial query algorithm use memory efficiently for a huge number of elements.

Because traditional 2-D interval spatial query algorithms (like kd-tree, R-tree, Q-tree) require at least four pointers for each item, the minimum memory overhead per item will be >4×8=32 bytes on 64-bit operation system in theory. A 3-D query requires 48 bytes per item.

On the other hand, using the techniques described herein, one may achieve the memory overhead <0.05 bytes or less for the cases with more than 1 billion items.

One way to allocate memory for storing information about items is to allocate the memory dynamically. Specifically, whenever a new instantiation is needed, the program will allocate memory for this instance. The code written in this way is very easy to understand and to maintain. One drawback of dynamic allocation, however, is extra memory consumption for fragmented memory. In order to "free" or return the memory of a class instantiation back to operating system, information about this piece of memory, such as size and links, needs to be associated with this piece of memory. This part of memory overhead can be 24-32 bytes per item on 64-bit Solaris and Linux.

To avoid dynamic memory allocation overhead, big chunk static memory allocation can be used, where possible. Specifically, items may be organized into an array (big chunk), and memory can be allocated for the array instead of for each item. In many situations, each grid in the grid hierarchy contains hundreds or thousands of items. With the hierarchical grid's special structure, a big chunk of static memory allocation may be used to minimize memory usage overhead to near 0, assuming all items are fixed at the time of grid hierarchy creation, i. e., the geometric information of all items are fixed or static, and there will not be new items added or deleted after the grid hierarchy is created. This is often the case in VLSI design automation. For example, during routing, locations of all the components are fixed, and there will not be new component added during routing process.

Based on this assumption, the grid hierarchy and item-to-grid assignments may be performed in two passes. During the first pass, all items are scanned and the grid to which each item should be assigned is calculated. During the first pass, a count is maintained to track the number of items that would be assigned to each grid, but the items are not actually assigned to grids. After pass 1, memory is allocated for the arrays that correspond to the grids, based on the count of items assigned to the grids. During second pass, all items are scanned again to calculate which grid to which each item should be assigned, and corresponding arrays are updated to reflect the item-to-grid assignments.

Memory Management when Adding New Items

Unfortunately, there may be situations in which new items need to be added to a domain space after arrays have been allocated for the grids. For example, as the design of a circuit matures, a small number items may need to be modified. For example, in a VLSI physical design, a designer may use a GUI editor to manually fix a few DRC errors after automatic placement and route. Over 99% data will be fixed. This part of data is called static data or static items. Less than 1% data will be modified. This part of data is called dynamic data or dynamic items.

According to one embodiment, all static items are stored in static array, as described above. When static array is full and new items need to be added to the grid that corresponds to the static array, then the new items are stored in a dynamic structure (such as dynamic link) associated with the grid.

Thus, when a new item is added to a grid in the grid hierarchy after a database was created, the grid for the new item is determined, and if there is space in the pre-allocated array of the grid, then the new item is stored in the pre-allocated array. If there is no space in the pre-allocated array for the grid, then the new item is stored in dynamic structure.

Handling New Items Outside the Original Encompassing Space

Figure 5:
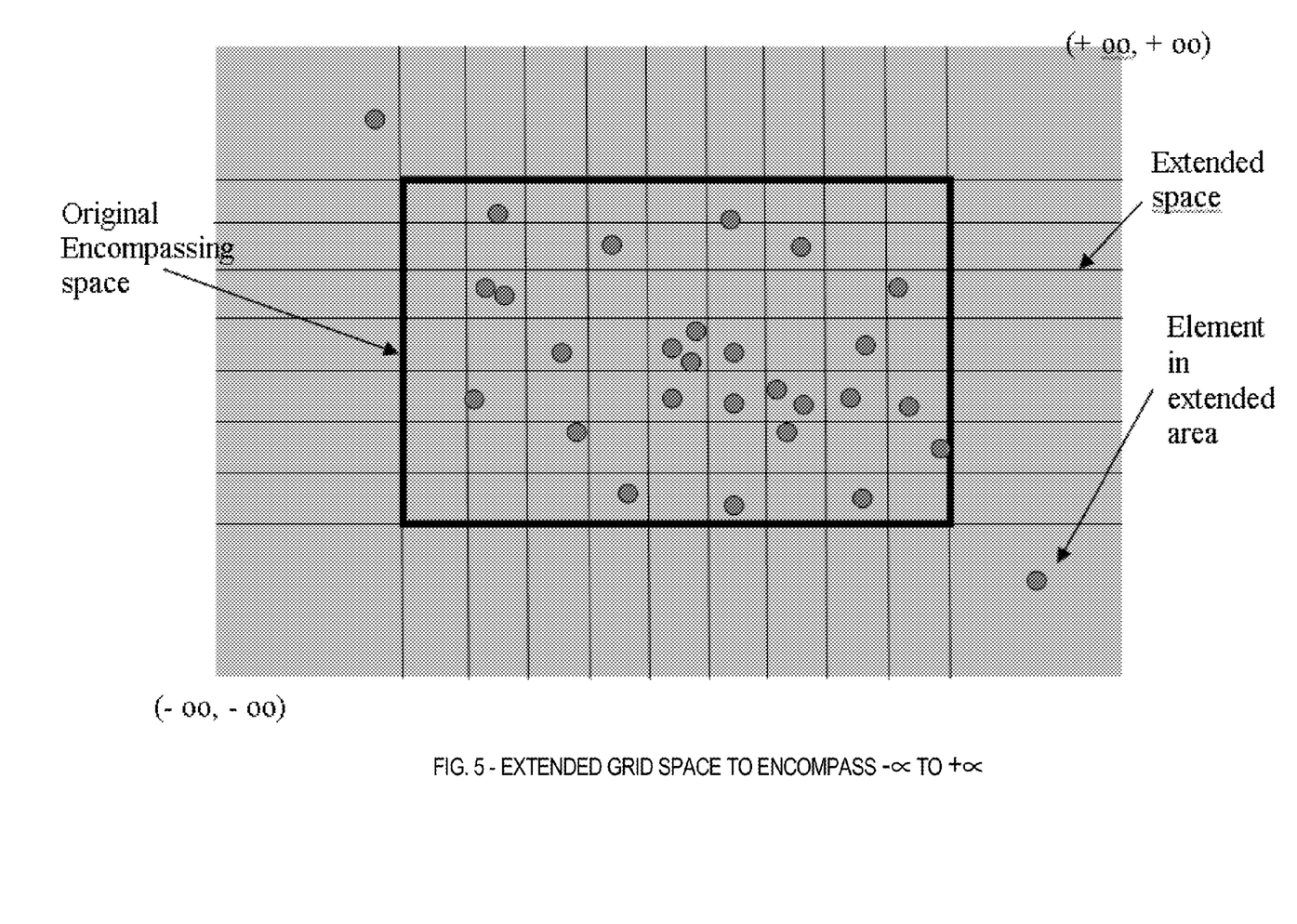
FIG. 5 is a block diagram illustrating how cells may be added beyond the original boundaries of a domain space to accommodate later-added items that fall outside the original boundaries of the domain space.

The examples given above assume that all items are inside a predefined encompassing space. In one embodiment, a mechanism is provided to allow the addition of new items that fall outside the original encompassing space. Specifically, the original domain space may be extended by adding rows (or columns) of cells at the original encompassing boundaries. For example, in X direction, one more column of cells may be added at the lower boundary of encompassing space. The X coordinate intervals of these new cells are $-\infty, X_{low}$ where $X_{low}$ is the X coordinate of lower boundary of the original encompassing space. Similarly, one more column of cells may be added at the upper boundary of encompassing space. The X coordinate intervals of these new cells are $X_{high}, \infty$ where $X_{high}$ is the X coordinate of upper boundary of the original encompassing space. Similarly, cells may be added to extend all dimensions, as shown in FIG. 5. Therefore, the extended space will cover all possible locations in all dimensions.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
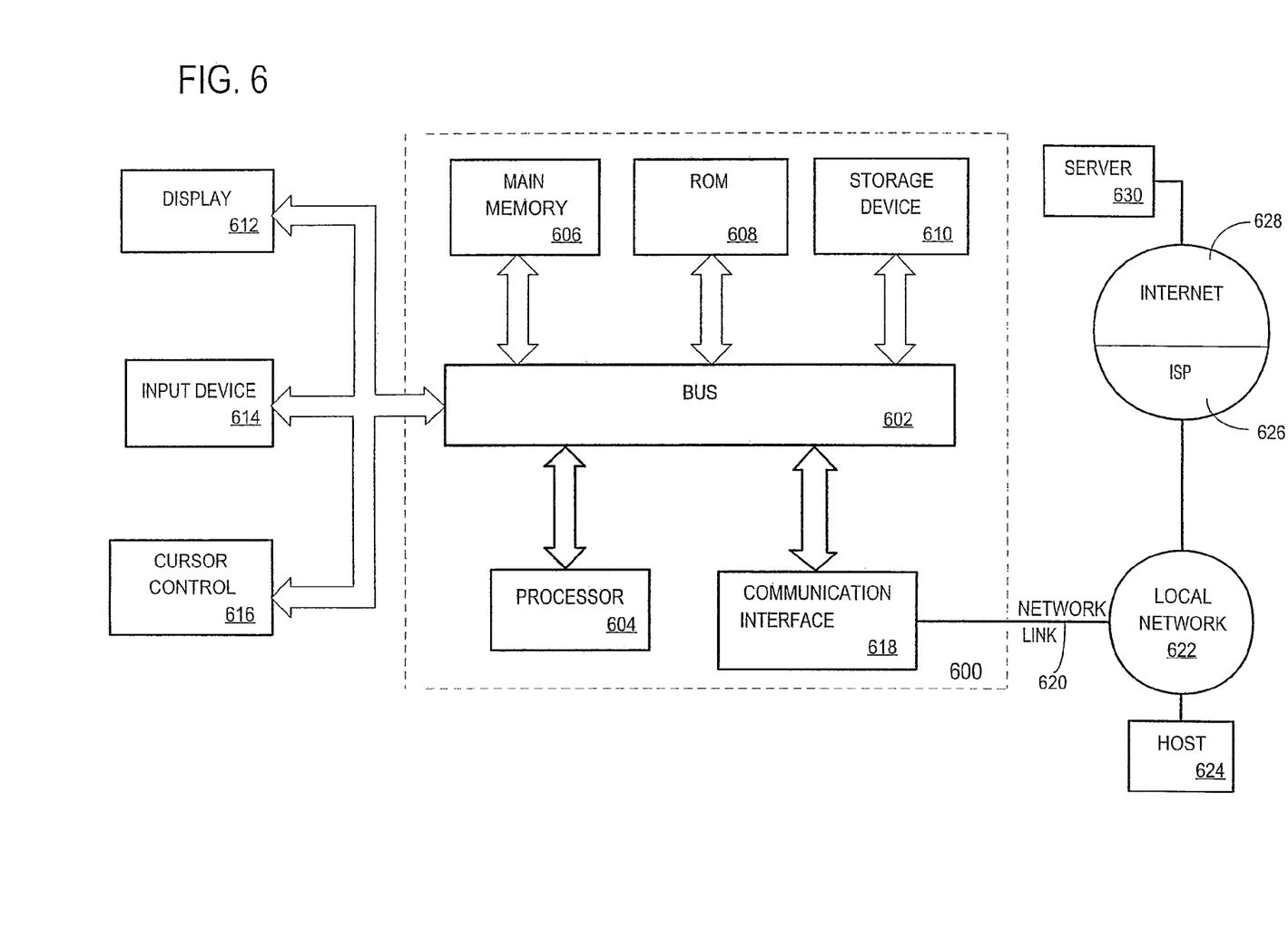
FIG. 6 is a block diagram of a computer system upon which embodiments of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for performing a spatial query, the method comprising:
dividing a domain space into cells by applying a grid of grid lines to the domain space;
assigning a plurality of items that belong to the domain space to the cells based on the location of the items within the domain space, wherein each item of the plurality of items is assigned to a single cell;
in response to a spatial query that specifies location criteria, performing the steps of:
determining a query window based on the location criteria;
producing an expanded query window whose boundaries coincide with the gridlines of the grid by expanding the query window;
based on the query window, separating cells that fall within the expanded query window into a set of fully-covered cells and a set of partially-covered cells;
automatically adding, to a matching set for said spatial query, items assigned to cells in the set of fully-covered cells;

automatically disqualifying, from the matching set, items assigned to cells outside the expanded query window;

evaluating items assigned to cells in the set of partially-covered cells against the location criteria of the spatial query;

adding, to the matching set, items assigned to cells in the set of partially-covered cells only if the items satisfy the location criteria; and returning the matching set;

wherein the method is performed by one or more computing devices.

2. The method of claim 1, wherein:

the plurality of items are items of size; and the method further includes determining an amount by which to expand the query window in a particular dimension based, at least in part, on a maximum number of gridlines that any single item crosses, in the particular dimension, within the grid.

3. The method of claim 2, wherein each of the plurality of items is assigned to a cell based on a reference point associated with the item.

4. The method of claim 3, wherein:

the reference point located on a particular corner of each item;

determining an amount by which to expand the first query window in the particular dimension includes expanding a particular border of the first query window N+1 gridlines;

N is the maximum number of gridlines that any single item crosses in the particular dimension;

the particular border is the left border when the particular dimension is a horizontal dimension and the particular corner is on the left side of each item;

the particular border is the right border when the particular dimension is a horizontal dimension and the particular corner is on the right side of each item;

the particular border is the upper border when the particular dimension is a vertical dimension and the particular corner is on the top side of each item; and the particular border is the bottom border when the particular dimension is a vertical dimension and the particular corner is on the bottom side of each item.

5. The method of claim 1, wherein:

the grid is a first grid of a plurality of grids that are applied to the domain space;

the plurality of grids includes a second grid that has differently sized cells than the first grid; and the method further comprises:

assigning a another plurality of items that belong to the domain space to the cells of the second grid based on the location of the items within the domain space, wherein each item of the other plurality of items is assigned to a single cell within the second grid; and in response to the spatial query, performing the steps of:

determining a another query window based on the location criteria;

producing another expanded query window whose boundaries coincide with gridlines of the second grid by expanding the other query window;

based on the other query window, separating cells that fall within the other expanded query window into another set of fully-covered cells and another set of partially-covered cells;

automatically adding, to the matching set for said spatial query, items assigned to cells in the other set of fully-covered cells;

automatically disqualifying, from the matching set, items assigned to cells in the second grid that are outside the other expanded query window;

evaluating items assigned to cells in the other set of partially-covered cells against the location criteria of the spatial query; and adding, to the matching set, items assigned to cells in the other set of partially-covered cells only if the items satisfy the location criteria.

6. The method of claim 5, wherein the grid, of the plurality of grids, to which items are assigned is based, at least in part, on the size of the items.

7. The method of claim 5, wherein cells within the first grid are smaller than cells within the second grid, and items are assigned to the second grid if the size of the items is sufficiently large to cross more than N gridlines in the first grid; and wherein N is a maximum grid crossing amount established for the first grid.

8. The method of claim 1, wherein spacing between gridlines within at least one dimension is not uniform.

9. The method of claim 8, wherein spacing between a first set of adjacent gridlines in the at least one dimension is established to be smaller than spacing between a second set of adjacent gridlines in the at least one dimension, based on item density between the first set of adjacent gridlines being greater than item density between the second set of adjacent gridlines.

10. The method of claim 1, wherein plurality of items includes items of a Very Large Scale Integration (VLSI) design of a circuit and the location criteria specifies a particular region within the circuit.

11. A non-transitory computer-readable medium storing instructions which, when executed by one or more processors, cause performance of a method for performing a spatial query, the method comprising the steps of:

dividing a domain space into cells by applying a grid of gridlines to the domain space;

assigning a plurality of items that belong to the domain space to the cells based on the location of the items within the domain space, wherein each item of the plurality of items is assigned to a single cell; and in response to a spatial query that specifies location criteria, performing the steps of:

determining a query window based on the location criteria;

producing an expanded query window whose boundaries coincide with the gridlines of the grid by expanding the query window;

based on the query window, separating cells that fall within the expanded query window into a set of fully-covered cells and a set of partially-covered cells;

automatically adding, to a matching set for said spatial query, items assigned to cells in the set of fully-covered cells;

automatically disqualifying, from the matching set, items assigned to cells outside the expanded query window;

evaluating items assigned to cells in the set of partially-covered cells against the location criteria of the spatial query;

adding, to the matching set, items assigned to cells in the set of partially-covered cells only if the items satisfy the location criteria; and returning the matching set;

wherein the method is performed by one or more computing devices.

12. The non-transitory computer-readable medium of claim 11, wherein:
the plurality of items are items of size; and
the method further includes determining an amount by which to expand the query window in a particular dimension based, at least in part, on a maximum number of gridlines that any single item crosses, in the particular dimension, within the grid.

13. The non-transitory computer-readable medium of claim 12, wherein each of the plurality of items is assigned to a cell based on a reference point associated with the item.

14. The non-transitory computer-readable medium of claim 13, wherein:
the reference point located on a particular corner of each item;
determining an amount by which to expand the query window in the particular dimension includes expanding a particular border of the first query window N+11 gridlines;
N is the maximum number of gridlines that any single item crosses in the particular dimension;
the particular border is the left border when the particular dimension is a horizontal dimension and the particular corner is on the left side of each item;
the particular border is the right border when the particular dimension is a horizontal dimension and the particular corner is on the right side of each item;
the particular border is the upper border when the particular dimension is a vertical dimension and the particular corner is on the top side of each item; and
the particular border is the bottom border when the particular dimension is a vertical dimension and the particular corner is on the bottom side of each item.

15. The non-transitory computer-readable medium of claim 11, wherein:
the grid is a first grid of a plurality of grids that are applied to the domain space;
the plurality of grids includes a second grid that has differently sized cells than the first grid; and
the method further comprises:
assigning a second plurality of items that belong to the domain space to the cells of the second grid based on the location of the items within the domain space, wherein each item of the second plurality of items is assigned to a single cell within the second grid; and
in response to the spatial query, performing the further steps of:
determining another query window based on the location criteria;
expanding the other query window to produce another expanded query window whose boundaries coincide with gridlines of the second grid;
based on the other query window, separating cells that fall within the other expanded query window into a second set of fully-covered cells and a second set of partially-covered cells;
automatically adding, to the matching set for said spatial query, items assigned to cells in the second set of fully-covered cells;
automatically disqualifying, from the matching set, items assigned to cells in the second grid that are outside the other expanded query window;
evaluating items assigned to cells in the second set of partially-covered cells against the location criteria of the spatial query; and
adding, to the matching set, items assigned to cells in the second set of partially-covered cells only if the items satisfy the location criteria.

16. The non-transitory computer-readable medium of claim 15, wherein the grid, of the plurality of grids, to which items are assigned is based, at least in part, on the size of the items.

17. The non-transitory computer-readable medium of claim 15,
wherein cells within the first grid are smaller than cells within the second grid, and items are assigned to the second grid if the size of the items is sufficiently large to cross more than N gridlines in the first grid; and
wherein N is a maximum grid crossing amount established for the first grid.

18. The non-transitory computer-readable medium of claim 11, wherein spacing between gridlines within at least one dimension is not uniform.

19. The non-transitory computer-readable medium of claim 18, wherein spacing between a first set of adjacent gridlines in the at least one dimension is established to be smaller than spacing between a second set of adjacent gridlines in the at least one dimension, based on item density between the first set of adjacent gridlines being greater than item density between the second set of adjacent gridlines.

20. The non-transitory computer-readable medium of claim 11, wherein plurality of items includes items of a Very Large Scale Integration (VLSI) design of a circuit and the location criteria specifies a particular region within the circuit.

* * * * *

UNITED STATES PATENT AND TRADEMARK OFFICE
CERTIFICATE OF CORRECTION

PATENT NO. : 9,977,789 B2
APPLICATION NO. : 13/306820
DATED : May 22, 2018
INVENTOR(S) : Zhu et al.

It is certified that error appears in the above-identified patent and that said Letters Patent is hereby corrected as shown below:

In the Specification

In Column 4, Line 27, delete "cells)" and insert -- cells). --, therefor.

In Column 4, Line 29, delete "set" and insert -- set. --, therefor.

In Column 4, Line 31, delete "cells)" and insert -- cells). --, therefor.

In Column 4, Line 35, delete "query" and insert -- query. --, therefor.

In Column 4, Line 38, delete "query" and insert -- query. --, therefor.

In Column 9, Line 61, delete "grid in in" and insert -- grid in --, therefor.

In Column 10, Line 2, delete "the a" and insert -- the --, therefor.

Signed and Sealed this
Sixth Day of November, 2018

Andrei Iancu
*Director of the United States Patent and Trademark Office*